(12) United States Patent
Seo et al.

(10) Patent No.: US 9,946,116 B2
(45) Date of Patent: Apr. 17, 2018

(54) LIQUID CRYSTAL DISPLAY DEVICE HAVING REDUCED COLOR SHIFT

(75) Inventors: Joo Hong Seo, Hwaseong-si (KR); Jeong Uk Heo, Asan-si (KR); Won Jin Kim, Hwaseong-si (KR); Seung Jin Kim, Asan-si (KR); Sun-Jung Lee, Yongin-si (KR); Sang-Hun Jung, Asan-si (KR); Min Hee Son, Anyang-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 783 days.

(21) Appl. No.: 13/428,942

(22) Filed: Mar. 23, 2012

(65) Prior Publication Data

US 2013/0088668 A1    Apr. 11, 2013

(30) Foreign Application Priority Data

Oct. 7, 2011    (KR) .......................... 10-2011-0102548

(51) Int. Cl.
*G02F 1/1343*    (2006.01)
*G02F 1/1337*    (2006.01)
*G02F 1/1362*    (2006.01)

(52) U.S. Cl.
CPC .. *G02F 1/133784* (2013.01); *G02F 1/134363* (2013.01); *G02F 1/136286* (2013.01);
(Continued)

(58) Field of Classification Search
CPC .......................................... G02F 2001/134372
(Continued)

(56) References Cited

U.S. PATENT DOCUMENTS 7,098,981 B2    8/2006    Nakayoshi et al.
7,502,089 B2    3/2009    Yoo et al.
(Continued)

FOREIGN PATENT DOCUMENTS

JP    2008-097049 A    4/2008
JP    2008180928 A * 8/2008
(Continued)

*Primary Examiner* — Nathanael R Briggs
*Assistant Examiner* — Alexander Gross
(74) *Attorney, Agent, or Firm* — Innovation Counsel LLP

(57) ABSTRACT

The present invention relates to a liquid crystal display device that prevents a color shift by allowing two sub-pixel areas to have the same transmittance. A liquid crystal display device according to the present invention includes a data line that includes: a connection portion having a direction of extension perpendicular to that of a gate line; a first portion oriented at a first angle with respect to a direction of extension of the connection portion; and a second portion oriented at a second angle different from the first angle with respect to the direction of extension of the connection portion, and wherein an angle between a rubbing direction of the liquid crystal and the connection portion satisfies $$\theta_L = \frac{\theta_2 - \theta_1}{2}$$

(where $\theta_L$ is the angle between the rubbing direction of the liquid crystal and the direction of extension of the connection portion, $\theta_1$: the first angle, $\theta_2$: the second angle).

19 Claims, 6 Drawing Sheets

(52) U.S. Cl.
CPC .. *G02F 1/133707* (2013.01); *G02F 1/136227* (2013.01); *G02F 2001/134345* (2013.01); *G02F 2001/134372* (2013.01)

(58) Field of Classification Search
USPC .......................................................... 349/126
See application file for complete search history.

(56) References Cited

U.S. PATENT DOCUMENTS

| | | | |
|---|---|---|---|
| 2002/0180902 A1* | 12/2002 | Izumi et al. ..................... | 349/43 |
| 2005/0264720 A1* | 12/2005 | Itou ................... | G02F 1/133528 349/99 |
| 2007/0052897 A1 | 3/2007 | Kim et al. | |
| 2007/0052900 A1 | 3/2007 | Cho et al. | |
| 2009/0115712 A1* | 5/2009 | Morimoto et al. .............. | 345/87 |
| 2009/0152564 A1* | 6/2009 | Wang ................. | G02F 1/133707 257/72 |
| 2010/0296040 A1* | 11/2010 | Han .................. | G02F 1/134363 349/139 |
| 2011/0050551 A1* | 3/2011 | Ota et al. ......................... | 345/87 |
| 2011/0058128 A1* | 3/2011 | Adachi et al. .................. | 349/96 |
| 2012/0112213 A1 | 5/2012 | Lee et al. | |

FOREIGN PATENT DOCUMENTS

| | | |
|---|---|---|
| JP | 2010-019873 A | 1/2010 |
| JP | 2010-048905 A | 3/2010 |
| KR | 1020020044295 A | 6/2002 |
| KR | 1020050003500 A | 1/2005 |
| KR | 100730396 B1 | 6/2007 |
| KR | 100835112 B1 | 5/2008 |
| KR | 1020080040304 A | 5/2008 |
| KR | 1020100118235 A | 11/2010 |

* cited by examiner

LIQUID CRYSTAL DISPLAY DEVICE HAVING REDUCED COLOR SHIFT

CROSS-REFERENCE TO RELATED APPLICATION

This application claims priority to, and the benefit of, Korean Patent Application No. 10-2011-0102548 filed in the Korean Intellectual Property Office on Oct. 7, 2011, the entire contents of which are incorporated herein by reference.

BACKGROUND (a) Technical Field

Embodiments of the present invention relate generally to liquid crystal display devices. More particularly, embodiments of the present invention relate to liquid crystal display devices that prevent or reduce color shift.

(b) Description of the Related Art

Liquid crystal display devices are currently one of the most widely used types of flat panel displays. Such devices typically include two display panels on which field generating electrodes such as a pixel electrode and a common electrode are formed, as well as a liquid crystal layer that is disposed therebetween. The devices display an image by applying a voltage to field generating electrodes to generate an electric field in the liquid crystal layer, which determines alignment of liquid crystal molecules of the liquid crystal layer and controls polarization of incident light.

Liquid crystal display devices utilize various modes, and one such mode that has found a degree of acceptance is plane line switching (PLS) mode. In PLS mode, the pixel electrode and the common electrode are formed on the same substrate, and an electric field is formed between the two electrodes to align liquid crystal molecules.

In PLS mode, to improve visibility, one pixel area is divided into two sub-pixel areas, and a direction or orientation of the pixel electrode is different in each sub-pixel area. It is preferable that the area of the pixel electrode is the same in each sub-pixel area.

Also, to reduce load on the data lines while still maintaining transmittance, a passivation layer made of an organic insulating material is formed under the common electrode. The thickness of the organic insulating material is large as compared to inorganic insulating material, meaning that a contact hole formed through the organic insulating material to electrically connect the common electrode to a common line must be relatively large.

The size of this hole means that the contact area between the common electrode and the common line extends at least partially inside the pixel area of one sub-pixel, which reduces the transmittance of that sub-pixel.

This results in the transmittance of one sub-pixel being lower than the transmittances of other sub-pixels. Thus, the transmittances of two sub-pixel areas are different, generating an undesirable a color shift in resulting images.

The above information disclosed in this Background section is only for enhancement of understanding of the background of the invention and therefore it may contain information that does not form the prior art that is already known in this country to a person of ordinary skill in the art.

SUMMARY

The present invention provides a liquid crystal display device that prevents or reduces a color shift, so that two sub-pixel areas have substantially the same transmittance.

A liquid crystal display device according to an exemplary embodiment of the present invention includes: a first substrate and a second substrate; a liquid crystal positioned between the first substrate and the second substrate; a gate line and a data line formed on the first substrate and defining a pixel area; a switching element connected to the gate line and the data line; a common line separated from the gate line; a contact electrode extending from the common line; a common electrode connected to the contact electrode and formed in the pixel area; and a pixel electrode electrically separated from the common electrode, formed in the pixel area, connected to the switching element, and including a slit, wherein the data line includes: a connection portion having a direction of extension at least approximately perpendicular to the gate line; a first portion oriented at a first angle with respect to a direction of extension of the connection portion; and a second portion oriented at a second angle with respect to a direction of extension of the connection portion, wherein the second angle is different from the first angle, and wherein an angle between the rubbing direction of the liquid crystal and the direction of extension of the connection portion satisfies $$\theta_L = \frac{\theta_2 - \theta_1}{2}$$

($\theta_L$: the angle between the rubbing direction of the liquid crystal and the direction of extension of the connection portion, $\theta_1$: the first angle, $\theta_2$: the second angle), The pixel area may include a first sub-pixel area formed at least approximately parallel to the first portion of the data line, and a second sub-pixel area formed at least approximately parallel to the second portion of the data line.

The contact electrode may be formed inside the first sub-pixel area, and the switching element may be formed outside the pixel area.

A length of the first portion and a length of the second portion may be such that an area of the first sub-pixel area minus an area occupied by the contact electrode is substantially the same as an area of the second sub-pixel area.

The connection portion, the first portion, and the second portion may be formed in plural, and each connection portion may connect a respective one of the second portions to a respective one of the first portions.

The first angle and the second angle may be such that a plurality of the connection portions are positioned along one line.

The slit can be formed at least partially in the first sub-pixel area, and an angle between the portion of the slit formed in the first sub-pixel area and the direction of extension of the connection portion may be the same as the first angle.

The slit can be formed at least partially in the second sub-pixel area, and an angle between the portion of the slit formed in the second sub-pixel area and the direction of extension of the connection portion is the same as the second angle.

An angle between the rubbing direction of the liquid crystal and the portion of the slit formed in the first sub-pixel area may be the same as an angle between the rubbing direction of the liquid crystal and the portion of the slit formed in the second sub-pixel area.

The liquid crystal display device may further include: a first passivation layer and a second passivation layer each formed on the first substrate; a first contact hole exposing the contact electrode and formed in the first passivation layer; a second contact hole exposing at least a portion of the switching element and formed in both the first passivation layer and the second passivation layer, wherein the common electrode may be formed directly on the first passivation layer and is connected to the contact electrode through the first contact hole, and the pixel electrode may be formed directly on the second passivation layer and is connected to the switching element through the second contact hole.

The first passivation layer may be made of an organic insulating material.

The second passivation layer may be made of an inorganic insulating material.

The liquid crystal display device may further include a third passivation layer formed under the first passivation layer and made of an inorganic insulating material.

The liquid crystal display device may further include: a first passivation layer and a second passivation layer each formed on the first substrate; a first contact hole positioned over the contact electrode and formed in the first passivation layer; and a second contact hole positioned over at least a portion of the switching element and formed in the first passivation layer, wherein the pixel electrode may be formed directly on the first passivation layer and is connected to the switching element through the second contact hole, and the common electrode may be formed directly on the second passivation layer and is coupled to the contact electrode through the first contact hole.

A first polarizer formed outside the first substrate may be further included, and a transmissive axis of the first polarizer may be perpendicular to the rubbing direction of the liquid crystal.

The first polarizer may be formed as a rectangle having a same plane surface as the first substrate, and an angle between the transmissive axis of the first polarizer and one edge of the first polarizer may be substantially the same as an angle between the rubbing direction of the liquid crystal and the direction of extension of the connection portion.

A second polarizer formed outside the second substrate may be further included, and the transmissive axis of the second polarizer may be substantially perpendicular to the transmissive axis of the first polarizer.

A first polarizer formed outside the first substrate may be further included, and the transmissive axis of the first polarizer may be substantially the same as the rubbing direction of the liquid crystal.

The first polarizer may formed substantially as a rectangle having the same plane surface as the first substrate, and an angle between the transmissive axis of the first polarizer and one edge of the first polarizer may be substantially the same as an angle between the rubbing direction of the liquid crystal and the connection portion.

A second polarizer formed outside the second substrate may be further included, and the transmissive axis of the second polarizer may be substantially perpendicular to the transmissive axis of the first polarizer.

In the present invention, the area of the first sub-pixel area minus that of its contact electrode is substantially the same as the area of the second sub-pixel area, so that the areas of two sub-pixel areas have the same transmittance, thereby preventing the color shift.

Also, in the present invention, the data line close to the first sub-pixel area and the data line close to the second sub-pixel area are oriented at different angles, such that a shift of the data line is not generated.

Also, the rubbing of the liquid crystal is optimized such that substantially the same electric and optical characteristics are provided in two sub-pixel areas.

DETAILED DESCRIPTION OF EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Firstly, a liquid crystal display device according to an exemplary embodiment of the present invention will be described with reference to accompanying drawings.

Figure 1:
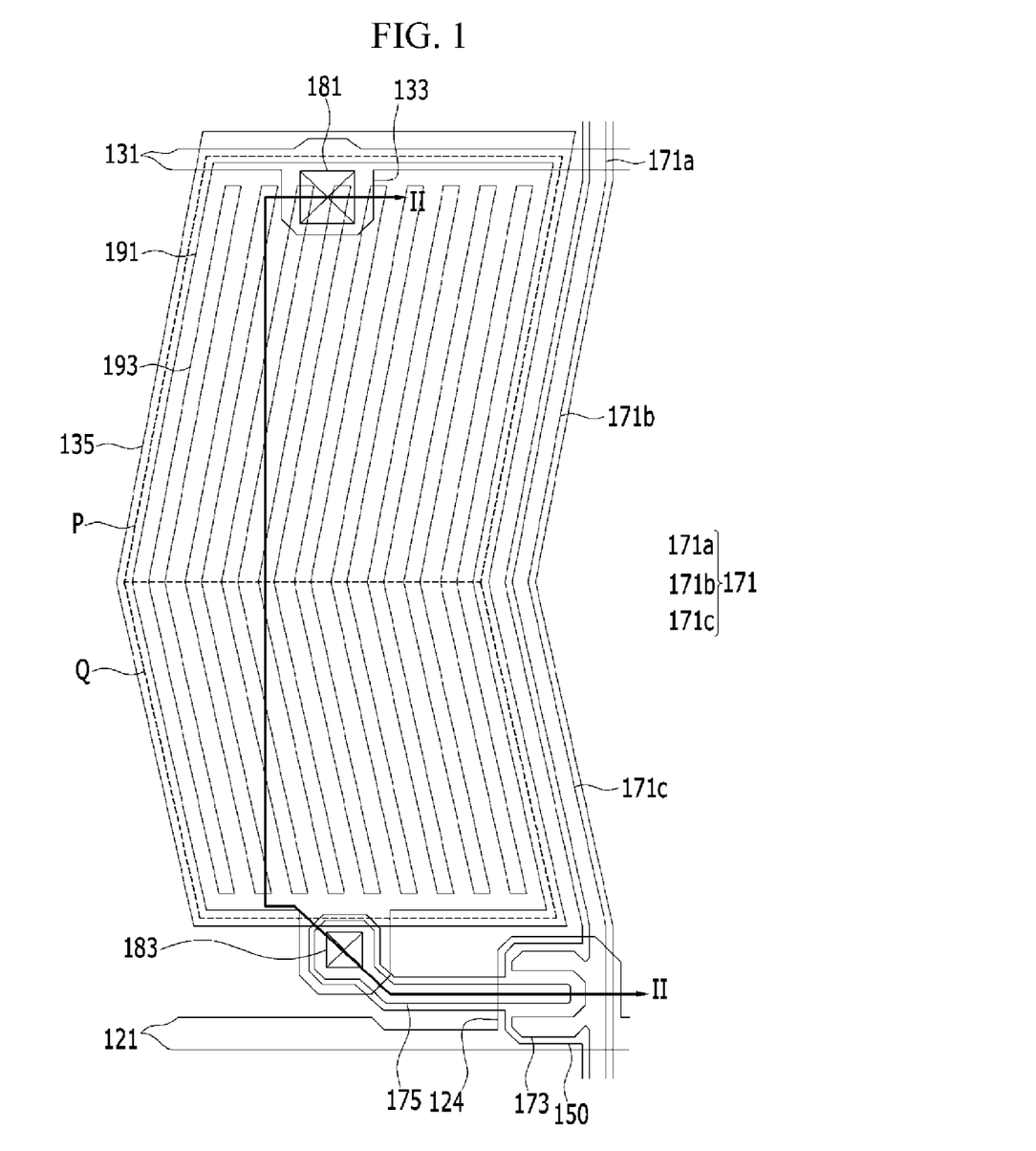
FIG. 1 is a plan view of a liquid crystal display device according to an exemplary embodiment of the present invention.
Figure 2:
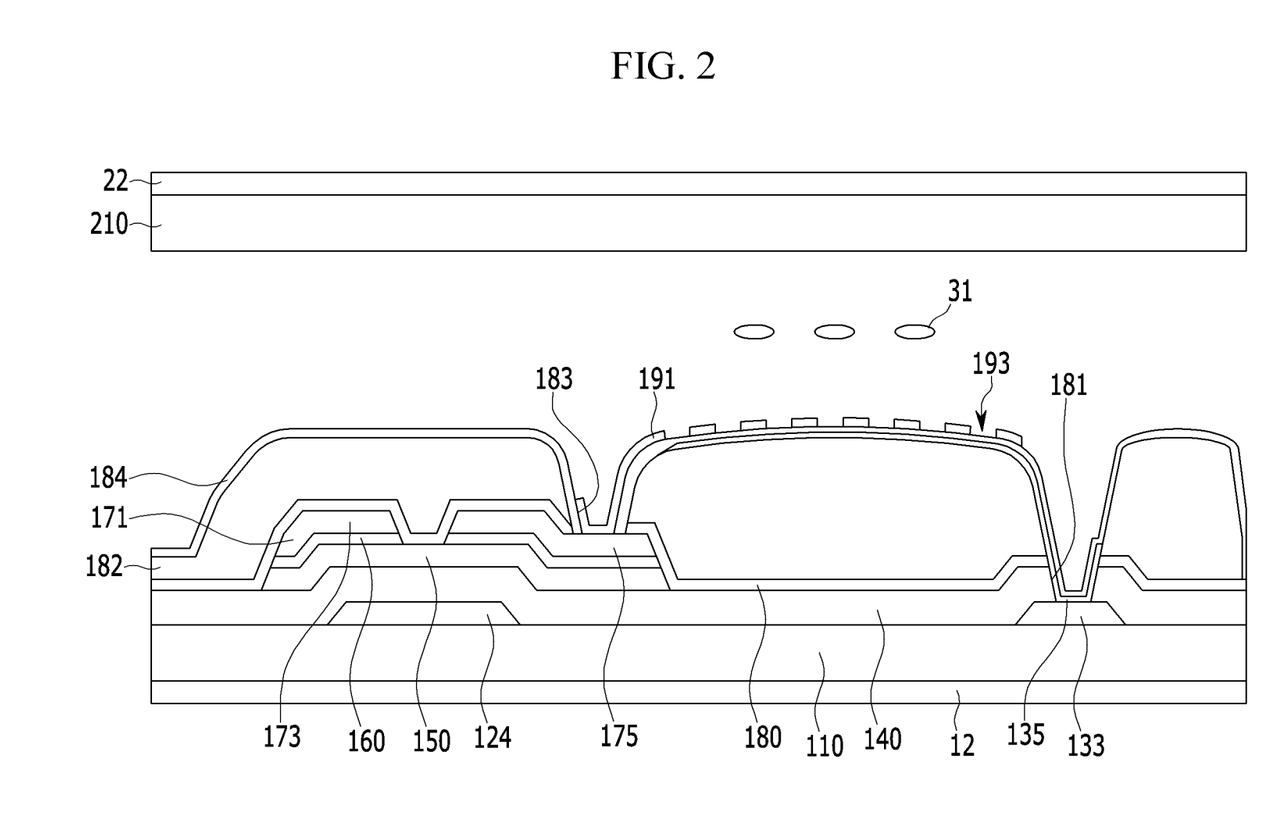
FIG. 2 is a cross-sectional view taken along the line II-II of FIG. 1.

FIG. 1 is a plan view of a liquid crystal display device according to an exemplary embodiment of the present invention, and FIG. 2 is a cross-sectional view taken along the line II-II of FIG. 1.

A liquid crystal display device according to an exemplary embodiment of the present invention includes a first substrate 110 and a second substrate 210 facing each other, and liquid crystal 31 formed or otherwise positioned between the first substrate 110 and the second substrate 210.

A gate line 121, and a gate electrode 124 protruded therefrom, are formed on the first substrate 110. Also formed are a common line 131 extending in a direction parallel to the gate line 121, and a contact electrode 133 protruded therefrom.

The gate line 121 transmits a gate signal and the common line 131 transmits a common voltage, and they mainly extend in a transverse direction.

A gate insulating layer 140 is formed on the whole (i.e., substantially the entire) surface of the first substrate 110 including the gate line 121, the gate electrode 124, the common line 131, and the contact electrode 133. The gate insulating layer 140 may be made of an inorganic insulating material including silicon oxide (SiOx) and/or silicon nitride (SiNx).

A semiconductor layer 150 is formed on the gate insulating layer 140. The semiconductor layer 150 is positioned on the gate electrode 124. An ohmic contact layer 160 is formed on the semiconductor layer 150.

A data line 171 intersecting the gate line 121, a source electrode 173 extending over the gate electrode 124 and protruding from the data line 171, and a drain electrode 175 separated from the source electrode 173 are then formed. In this embodiment, the source electrode 173 and drain electrode 175 are positioned on the ohmic contact layer 160. A channel is formed between the source electrode 173 and the drain electrode 175 that are separated, and the ohmic contact layer 160 is not positioned within the channel (here, the portion of the ohmic contact layer 160 roughly corresponding to the channel region has been removed).

The data line 171 intersects the gate line 121, thereby defining a pixel area. Here, one pixel area may include a first sub-pixel area P and a second sub-pixel area Q. The data line 171 is formed to be generally perpendicular to the gate line 121 and includes a connection portion 171a overlapping the gate line 121, a first portion 171b connected to the connection portion 171a and formed close to (and in this case, parallel to an edge of) the first sub-pixel area P, and a second portion 171c connected to the connection portion 171a and formed close to (and in this case, parallel to an edge of) the second sub-pixel area Q.

The connection portion 171a, the first portion 171b, and the second portion 171c of the data line 171 are formed in plural, the connection portion 171a connects the second portion 171c disposed above it to the first portion 171b disposed below it. The data line 171 will be described in further detail with reference to FIG. 3 below.

The semiconductor layer 150 may also be formed under the data line 171 as well as the source electrode 173 and the drain electrode 175, as shown in FIG. 2. The semiconductor layer 150, the ohmic contact layer 160, the data line 171, the source electrode 173, and the drain electrode 175 may be formed by using a single mask.

The gate electrode 124, the semiconductor layer 150, the ohmic contact layer 160, the source electrode 173, and the drain electrode 175 collectively form one switching element. The switching element is formed outside the second sub-pixel area Q. That is, the lower boundary of the second sub-pixel area Q is formed above or adjacent to the switching element, and the switching element is formed between the gate line 121 and the second sub-pixel area Q.

A first passivation layer 182 is formed on substantially the entire surface of the first substrate 110 including the gate line 121, the common line 131, the data line 171, the switching element, and the contact electrode 133. The first passivation layer 182 is made of an organic insulating material. A third passivation layer 180 made of an inorganic insulating material may be further formed under the first passivation layer 182.

The first passivation layer 182 includes a first contact hole 181 exposing the contact electrode 133.

A common electrode 135 is formed on the first passivation layer 182 so as to be connected to the contact electrode 133 through the first contact hole 181. The common electrode 135 is formed over substantially the entire pixel area and is made of a transparent electrode material such as indium tin oxide (ITO) or indium zinc oxide (IZO).

The first passivation layer 182 is made of an organic insulating material such that, as above, it is thicker than a corresponding layer made of inorganic insulating material. Accordingly, the first contact hole 181 is relatively large as compared to the case in which the first passivation layer 182 is made of an inorganic insulating material.

A second passivation layer 184 is formed over the whole (i.e. substantially the entire) surface of the first substrate 110, including the common electrode 135. The second passivation layer 184 may be made of an inorganic insulating material.

The first passivation layer 182 and the second passivation layer 184 have a second contact hole 183 exposing at least a portion of the switching element, more specifically the drain electrode 175.

A pixel electrode 191 is formed on the second passivation layer 184 to be connected to the drain electrode 175 through the second contact hole 183. The pixel electrode 191 is formed in the pixel area and is made of the transparent electrode material such as indium tin oxide (ITO) or indium zinc oxide (IZO). The pixel electrode 191 includes a plurality of slits 193.

That is, the second passivation layer 184 is formed between the common electrode 135 and the pixel electrode 191. The common electrode 135 is formed under the second passivation layer 184, and the pixel electrode 191 is formed on the second passivation layer 184. The common electrode 135 is formed on substantially the entire pixel area and the pixel electrode 191 includes slits 193. Accordingly, the liquid crystal 31 positioned over the slits 193 is moved by the horizontal electric field formed between the common electrode 135 and the pixel electrode 191.

Next, the data line 171 and the pixel electrode 191 will be described in further detail with reference to FIG. 3 to FIG. 5.

Figure 3:
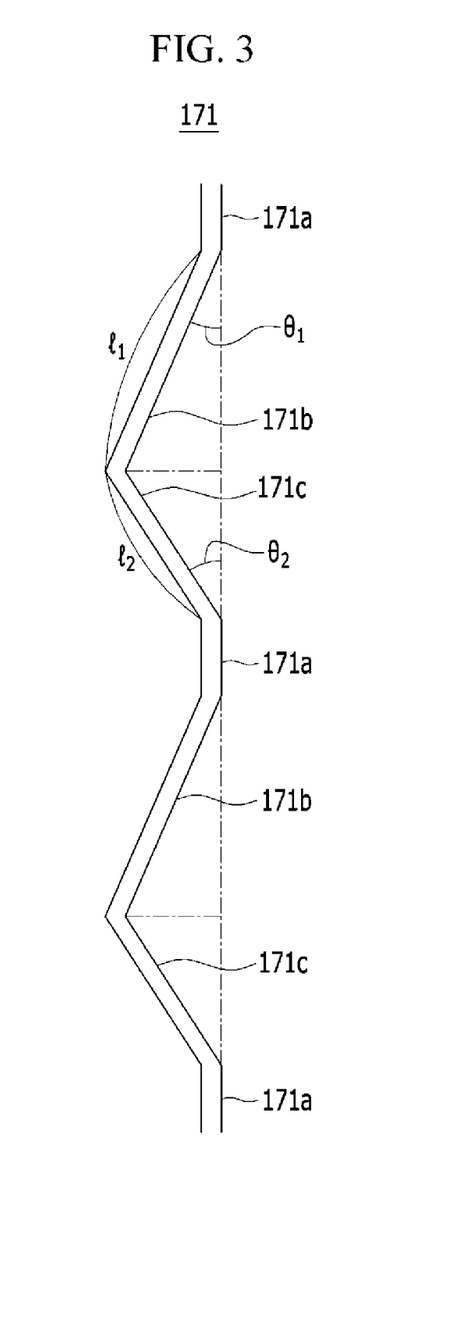
FIG. 3 is a plan view of a data line of a liquid crystal display device according to an exemplary embodiment of the present invention.
Figure 4:
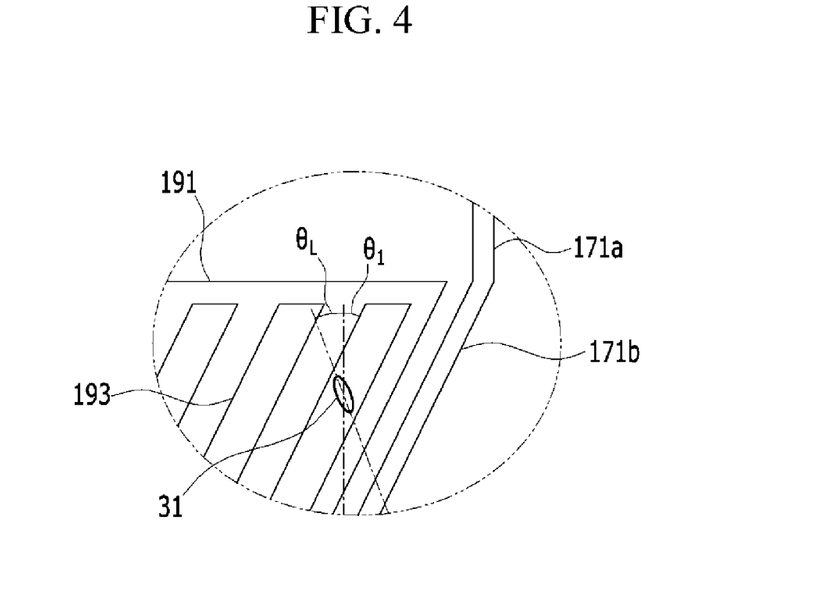
FIG. 4 and FIG. 5 are plan views of a portion of a data line and a pixel electrode of a liquid crystal display device according to an exemplary embodiment of the present invention.
Figure 5:
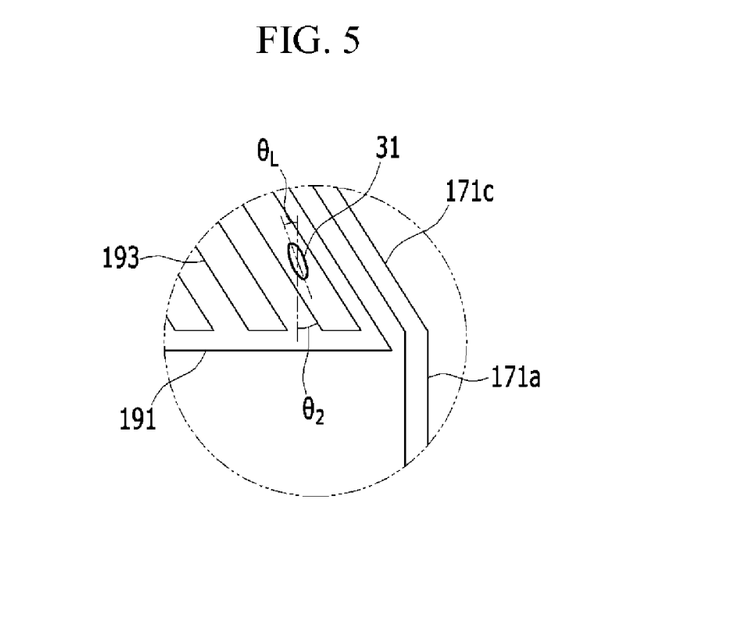

FIG. 3 is a plan view of a data line of a liquid crystal display device according to an exemplary embodiment of the present invention, and FIG. 4 and FIG. 5 are plan views of portions of a data line and a pixel electrode of a liquid crystal display device according to an exemplary embodiment of the present invention.

As shown in FIG. 3, the first portion 171b of the data line 171 is bent, or oriented at, a first angle $\theta_1$ with respect to an extending line or major direction/direction of extension (indicated by a dotted line) of the connection portion 171a. Also, the second portion 171c of the data line 171 is oriented at a second angle $\theta_2$ with respect to the major direction or direction of extension of the connection portion 171a.

The first sub-pixel area P includes two edges parallel to the first portion 171b of the data line 171 and two edges parallel to the gate line 121, and the second sub-pixel area Q includes two edges parallel to the second portion 171c of the data line 171 and two edges parallel to the gate line 121.

If the lengths of the first portion 171b and the second portion 171c of the data line 171 are the same, the areas of the first sub-pixel area P and the second sub-pixel area Q are the same. In the present invention, the contact electrode 133 extends downward from the common line 131 (in the view of FIG. 1), thereby being formed inside the first sub-pixel area P, and the contact electrode 133 is formed as an opaque electrode such that the transmittance of the first sub-pixel area P is different from the transmittance of the second sub-pixel area Q. Accordingly, to achieve the same transmittance in the first sub-pixel area P and the second sub-pixel area Q, it is preferable that the area of the first sub-pixel area P, excluding the portion where the contact electrode 133 is positioned, is the same as the area of the second sub-pixel area Q.

For this, the area of the first sub-pixel area P must be larger than the area of the second sub-pixel area Q, and one way to achieve this is for the length $l_1$ of the first portion 171b of the data line 171 to be longer than the length $l_2$ of the second portion 171c. The length $l_1$ of the first portion 171b and the length $l_2$ of the second portion 171c are determined so that the area in the first sub-pixel area P excluding the area of contact electrode 133 is the same as the area of the second sub-pixel area Q.

The angle between the first portion 171b of the data line 171 and the connection portion 171a and the angle between the second portion 171c and the connection portion 171a are the same, and the length of the first portion 171b is shorter than the length of the second portion 171c such that the data line 171 is shifted to the left side as the data line 171 becomes closer to the lower side. Accordingly, the first portion 171b and the second portion 171c are formed with different angles with respect to the connection portion 171a for the data line 171 not to be shifted.

For To accomplish this, the second angle $\theta_2$ between the extending line of the connection portion 171a and the second portion 171c is made larger than the first angle $\theta_1$ between the extending line of the connection portion 171a and the first portion 171b. The first angle $\theta_1$ and the second angle $\theta_2$ are determined for a plurality of connection portions 171a to be positioned upon one line.

As shown in FIG. 4, an edge of the pixel electrode 191 formed in the first sub-pixel area P is generally parallel to the first portion 171b of the data line 171, thereby forming the first angle $\theta_1$ with the extending line of the connection portion 171a of the data line 171. Also, the slit 193 formed in the first sub-pixel area P is generally parallel to the first portion 171b of the data line 171, thereby also oriented at the first angle $\theta_1$.

As shown in FIG. 5, the pixel electrode 191 formed in the second sub-pixel area Q is generally parallel to the second portion 171c of the data line 171, thereby forming the second angle $\theta_2$ with the extending line of the connection portion 171a of the data line 171. Also, the slit 193 formed in the second sub-pixel area Q is generally parallel to the second portion 171c of the data line 171, thereby also oriented at the second angle $\theta_2$.

In an initial state, the liquid crystal 31 is rubbed to be aligned in a predetermined direction. At this time, the rubbing direction of the liquid crystal 31 may be set for the rotation angle of the liquid crystal 31 in the first sub-pixel area P to be the same as the rotation angle of the liquid crystal 31 in the second sub-pixel area Q when an electric field is formed between the common electrode 135 and the pixel electrode 191. That is, as shown in Equation 1 below, the angle of the rubbing direction of the liquid crystal 31 by the slit 193 of the first sub-pixel area P is set to be the same as the angle of the rubbing direction to align the liquid crystal 31 by the slit 193 formed in the second sub-pixel area Q.

$$\theta_1 + \theta_L = \theta_2 - \theta_L \quad \text{[Equation 1]}$$

($\theta_L$: an angle between the rubbing direction of the liquid crystal and the connection portion 171a of the data line 171, $\theta_1$: the first angle, $\theta_2$: the second angle)

Accordingly, the angle between the rubbing direction of the liquid crystal 31 and the connection portion 171a of the data line 171 may be represented by Equation 2 below.

$$\theta_L = \frac{\theta_2 - \theta_1}{2} \quad \text{[Equation 2]}$$

($\theta_L$: the angle between the rubbing direction of the liquid crystal and the connection portion 171a of the data line 171, $\theta_1$: the first angle, $\theta_2$: the second angle)

For example, when it is desired that the first angle $\theta_1$ is 5 degrees and the second angle $\theta_2$ is 7 degrees, the angle $\theta_L$ between the rubbing direction of the liquid crystal 31 and the connection portion 171a of the data line 171 becomes 1 degree. The angle $\theta_L$ between the rubbing direction of the liquid crystal 31 and the connection portion 171a of the data line 171 varies according to the magnitude of the first angle $\theta_1$ and the second angle $\theta_2$, and preferably has a value between about 0.1 degree to 5 degrees.

As shown in FIG. 2, the liquid crystal display device according to an exemplary embodiment of the present invention may further include a first polarizer 12 positioned outside the first substrate 110 and a second polarizer 22 positioned outside the second substrate 210. Next, the first polarizer 12 and the second polarizer 22 will be described with reference to FIG. 6 and FIG. 7.

Figure 6:
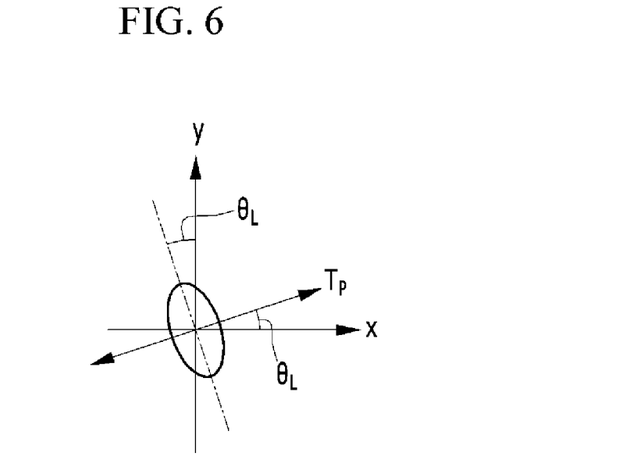
FIG. 6 and FIG. 7 are views of a transmissive axis of the first polarizer of a liquid crystal display device according to an exemplary embodiment of the present invention.
Figure 7:
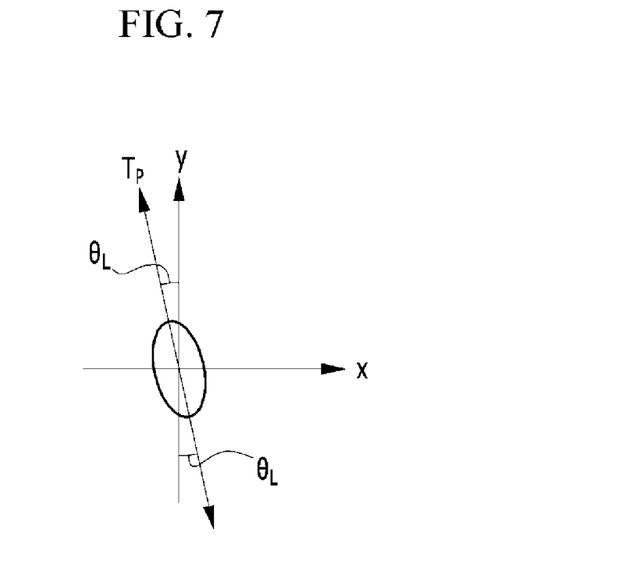

FIG. 6 and FIG. 7 are views of a transmissive axis of the first polarizer of a liquid crystal display device according to an exemplary embodiment of the present invention.

As shown in FIG. 6, the transmissive axis $T_P$ of the first polarizer 12 may be formed to be perpendicular to the rubbing direction of the liquid crystal 31, and is referred to as an O-mode. The direction parallel to the gate line 121 is indicated as the X-axis, and a direction parallel to the connection portion 171a of the data line 171 is indicated by as the Y-axis. The transmissive axis $T_P$ of the first polarizer 12 is inclined by the angle $\theta_L$ between the rubbing direction of the liquid crystal 31 and the connection portion 171a of the data line 171, with respect to the X-axis.

The first polarizer 12 is formed generally as a rectangle having the same plane surface as the first substrate 110, wherein two opposing edges are parallel to the X-axis, and the other two opposing edges are parallel to the Y-axis. Accordingly, the angle between the transmissive axis $T_P$ of the first polarizer 12 and one edge of the first polarizer 12 parallel to the X-axis is the same as the angle $\theta_L$ between the rubbing direction of the liquid crystal 31 and the connection portion 171a of the data line 171.

The transmissive axis of the second polarizer 22 is perpendicular to the transmissive axis $T_P$ of the first polarizer 12. That is, the transmissive axis of the second polarizer 22 is formed in the same direction as the rubbing direction of the liquid crystal 31.

As shown in FIG. 7, the transmissive axis $T_P$ of the first polarizer 12 may be formed in the same direction as the rubbing direction of the liquid crystal 31, and is referred to as an E-mode.

As above, the first polarizer 12 can be formed as a rectangle having the same plane surface as the first substrate 110. Two opposing edges are parallel to the X-axis, and the other two opposing edges are parallel to the Y-axis. Accordingly, the angle between the transmissive axis $T_P$ of the first polarizer 12 and an edge of the first polarizer 12 parallel to the Y-axis is the same as the angle $\theta_L$ between the rubbing direction of the liquid crystal 31 and the connection portion 171a of the data line 171.

The transmissive axis of the second polarizer 22 is perpendicular to the transmissive axis $T_P$ of the first polarizer 12. That is, the transmissive axis $T_P$ of the first polarizer 12 is inclined by the angle $\theta_L$ between the rubbing direction of the liquid crystal 31 and the connection portion 171a of the data line 171, with respect to the Y-axis.

Next, a liquid crystal display device according to another exemplary embodiment of the present invention will be described with reference to the accompanying drawings.

Figure 8:
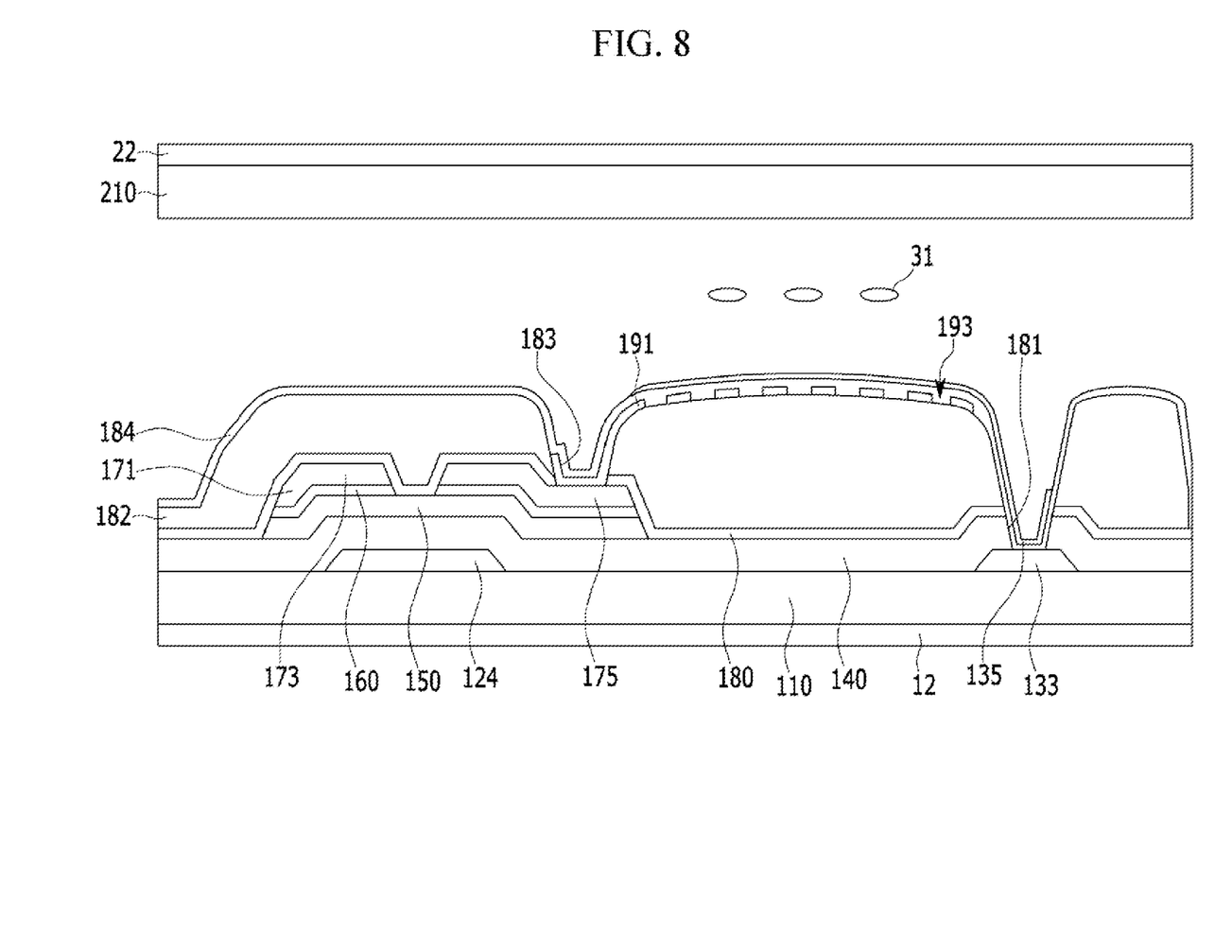
FIG. 8 is a cross-sectional view of a liquid crystal display device according to another exemplary embodiment of the present invention.

FIG. 8 is a cross-sectional view of a liquid crystal display device according to another exemplary embodiment of the present invention. A plan view of the liquid crystal display device according to the current exemplary embodiment of the present invention is the same as the plan view of the previous liquid crystal display device according to an exemplary embodiment of the present invention such that the description thereof is omitted.

The liquid crystal display device according to the current exemplary embodiment of the present invention is the same as most of the previous exemplary embodiment, such that the description thereof is omitted and only differences will be described.

Like the previous exemplary embodiment, in the liquid crystal display device according to the current exemplary embodiment of the present invention, the gate line 121, the gate electrode 124, the common line 131, the contact electrode 133, the data line 171, the source electrode 173, and the drain electrode 175 are formed on the first substrate 110.

The first passivation layer 182 is formed on the whole surface of the first substrate 110 including the gate line 121, the common line 131, the data line 171, the switching element, and the contact electrode 133. The first passivation layer 182 is made of an organic insulating material.

The first passivation layer 182 has the second contact hole 183 exposing at least a portion of the switching element, in detail, the drain electrode 175.

The pixel electrode 191, which is connected to the drain electrode 175 of the switching element through the second contact hole 183, is formed on the first passivation layer 182. The pixel electrode 191 is formed in the pixel area and is made of a transparent electrode material such as indium tin oxide (ITO) or indium zinc oxide (IZO). The pixel electrode 191 includes a plurality of slits 193.

The second passivation layer 184 is formed on the whole surface of the first substrate 110, including the pixel electrode 191. The second passivation layer 184 may be made of the inorganic insulating material.

The first contact hole 181 is formed through the first passivation layer 181 and the second passivation layer 184, so as to expose the contact electrode 133.

The common electrode 135 is formed on the second passivation layer 184, and is connected to the contact electrode 133 through the first contact hole 181. The common electrode 135 is formed through the entire pixel area, and is made of the transparent electrode material such as indium tin oxide (ITO) or indium zinc oxide (IZO).

That is, the second passivation layer 184 is formed between the pixel electrode 191 and the common electrode 135. The pixel electrode 191 is formed under the second passivation layer 184, and the common electrode 135 is formed on the second passivation layer 184.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of Symbols>

| | |
|---|---|
| 31: liquid crystal | 110: first substrate |
| 121: gate line | 124: gate electrode |
| 131: common line | 133: contact electrode |
| 135: common electrode | 140: gate insulating layer |

-continued

<Description of Symbols>

| | |
|---|---|
| 150: semiconductor layer | 160: ohmic contact layer |
| 171: data line | 171a: connection portion |
| 171b: first portion | 171c: second portion |
| 173: source electrode | 175: drain electrode |
| 180: third passivation layer | 181: first contact hole |
| 182: first passivation layer | 183: second contact hole |
| 184: second passivation layer | 191: pixel electrode |
| 193: slit | 210: second substrate |

What is claimed is:

1. The liquid crystal display device comprising:
   a first substrate and a second substrate;
   a liquid crystal positioned between the first substrate and the second substrate;
   a gate line and a data line disposed on the first substrate and defining a pixel area;
   a switching element connected to the gate line and the data line;
   a common line separated from the gate line;
   a contact electrode extending from the common line;
   a common electrode connected to the contact electrode and disposed in the pixel area; and
   a pixel electrode electrically separated from the common electrode, overlapping the common electrode in plan view, disposed in the pixel area, and connected to the switching element,
   wherein the pixel area comprises a first sub-pixel area and a second sub-pixel area,
   wherein the pixel electrode comprises a first sub-pixel electrode disposed in the first sub-pixel area and a second sub-pixel electrode disposed in the second sub-pixel area,
   wherein the first sub-pixel electrode comprises a first slit extending in a first direction, and the second sub-pixel electrode comprises a second slit extending in a second direction different from the first direction,
   wherein the contact electrode is disposed in the first sub-pixel area;
   wherein a side of the first sub-pixel area is oriented at a first oblique angle with respect to a normal to the gate line and a side of the second sub-pixel area is oriented at a second oblique angle with respect to the normal to the gate line, the second oblique angle being different from the first oblique angle, so that the first sub-pixel area is larger than the second sub-pixel area by an amount equal to an area of the contact electrode.

2. The liquid crystal display of claim 1, wherein:
   the data line includes:
      a first portion extending in the first direction and disposed adjacent to the first sub-pixel,
      a second portion extending in the second direction and disposed adjacent to the second sub-pixel, and
      a connection portion connecting the first portion and the second portion;
   a length of the first portion is different from a length of the second portion;
   the connection portion has a direction of extension at least approximately perpendicular to the gate line;
   the first portion is oriented at a first angle with respect to the direction of extension of the connection portion; and the second portion is oriented at a second angle with respect to the direction of extension of the connection portion, wherein the second angle is different from the first angle, and wherein an angle between a rubbing direction of the liquid crystal and the direction of extension of the connection portion satisfies $$\theta_L = \frac{\theta_2 - \theta_1}{2}$$

(where θL is an angle between the rubbing direction of the liquid crystal and the direction of extension of the connection portion, θ1: the first angle, θ2: the second angle).

3. The liquid crystal display device of claim 2, wherein the first angle and the second angle are such that a plurality of the connection portions are positioned along a line.

4. The liquid crystal display device of claim 2, wherein: the first slit is formed at least partially in the first sub-pixel area, and an angle between the portion of the first slit formed in the first sub-pixel area and the direction of extension of the connection portion is the same as the first angle.

5. The liquid crystal display device of claim 4, wherein the second slit is formed at least partially in the second sub-pixel area, and an angle between the portion of the second slit formed in the second sub-pixel area and the direction of extension of the connection portion is the same as the second angle.

6. The liquid crystal display device of claim 5, wherein an angle between the rubbing direction of the liquid crystal and the portion of the first slit formed in the first sub-pixel area is the same as an angle between a rubbing direction of the liquid crystal and the portion of the second slit formed in the second sub-pixel area.

7. The liquid crystal display device of claim 1, further comprising:
a first passivation layer and a second passivation layer each formed on the first substrate;
a first contact hole exposing the contact electrode and formed in the first passivation layer; and
a second contact hole exposing at least a portion of the switching element and formed in both the first passivation layer and the second passivation layer,
wherein the common electrode is formed directly on the first passivation layer and is connected to the contact electrode through the first contact hole, and
the pixel electrode is formed directly on the second passivation layer and is connected to the switching element through the second contact hole.

8. The liquid crystal display device of claim 7, wherein the first passivation layer is made of an organic insulating material and wherein the second passivation layer is made of an inorganic insulating material.

9. The liquid crystal display device of claim 8, further comprising
a third passivation layer formed under the first passivation layer and made of an inorganic insulating material.

10. The liquid crystal display device of claim 1, wherein the first angle ($\theta_1$) is substantially 5 degrees and the second angle ($\theta_2$) is substantially 7 degrees.

11. The liquid crystal display device of claim 1, further comprising:
a first passivation layer and a second passivation layer each formed on the first substrate;
a first contact hole positioned over the contact electrode and formed in the first passivation layer; and
a second contact hole positioned over at least a portion of the switching element and formed in the first passivation layer,
wherein the pixel electrode is formed directly on the first passivation layer and is connected to the switching element through the second contact hole, and
the common electrode is formed directly on the second passivation layer and is coupled to the contact electrode through the first contact hole.

12. The liquid crystal display device of claim 2, further comprising
a first polarizer formed outside the first substrate,
wherein a transmissive axis of the first polarizer is perpendicular to a rubbing direction of the liquid crystal.

13. The liquid crystal display device of claim 12, wherein the connection portion has a direction of extension at least approximately perpendicular to the gate line,
the first polarizer is formed as a rectangle having a same plane surface as the first substrate, and
an angle between the transmissive axis of the first polarizer and one edge of the first polarizer is substantially the same as an angle between the rubbing direction of the liquid crystal and the direction of extension of the connection portion.

14. The liquid crystal display device of claim 13, further comprising
a second polarizer formed outside the second substrate,
wherein a transmissive axis of the second polarizer is substantially perpendicular to the transmissive axis of the first polarizer.

15. The liquid crystal display device of claim 2, further comprising
a first polarizer formed outside the first substrate,
wherein a transmissive axis of the first polarizer is substantially the same as a rubbing direction of the liquid crystal.

16. The liquid crystal display device of claim 15, wherein the connection portion has a direction of extension at least approximately perpendicular to the gate line,
the first polarizer is formed substantially as a rectangle having the same plane surface as the first substrate, and
an angle between the transmissive axis of the first polarizer and one edge of the first polarizer is substantially the same as an angle between the rubbing direction of the liquid crystal and the connection portion.

17. The liquid crystal display device of claim 16, further comprising
a second polarizer formed outside the second substrate,
wherein a transmissive axis of the second polarizer is substantially perpendicular to the transmissive axis of the first polarizer.

18. The liquid crystal display device of claim 1, wherein the first sub-pixel area, excluding the portion where the contact electrode is positioned, has substantially the same size as the second sub-pixel area.

19. The liquid crystal display device of claim 2, wherein the contact electrode is disposed in the first sub-pixel area, and the length of the first portion is longer than the length of the second portion.

* * * * *